Feb. 12, 1929.  1,701,902

H. WEINBERG
MACHINE OR APPARATUS FOR USE IN SUPPORTING
ANIMALS WHILE BEING SLAUGHTERED
Filed March 29, 1928

Patented Feb. 12, 1929.

1,701,902

UNITED STATES PATENT OFFICE.

HARRIS WEINBERG, OF LEEDS, ENGLAND.

MACHINE OR APPARATUS FOR USE IN SUPPORTING ANIMALS WHILE BEING SLAUGHTERED.

Application filed March 29, 1928, Serial No. 265,741, and in Great Britain April 2, 1927.

This invention relates to machines or apparatus for use in supporting animals while being slaughtered, said machines or apparatus being of the type comprising a constantly pivoted support or carrier consisting of a rotatably mounted rectangular receptacle with sides adapted to permit of the animal walking into and being enclosed in said carrier with its head passed through an opening in the forward end. The chief object of the present invention is to improve the construction and arrangement of the parts of the machine or apparatus whereby the rotating or revolving of the carrier shall be rendered more easy and simple; also to enable the sides and top of the carrier to be adjusted to the size of the animal whereby the latter shall be more firmly held or secured in the carrier without risk of bruising, disturbing or frightening said animal when the carrier is reversed or set in motion. A further object is to enable the sides to be opened for releasing the carcass when the animal has been slaughtered.

According to the present invention the machine or apparatus comprises an arrangement of concentric rings, the outer one of which is stationary and the inner one of which supports the carrier to rotate within the outer ring, and the sides of the carrier are hinged to permit of their being swung open or closed against the sides of the animal, while the top of the carrier is also adapted to be closed down on to the back of the animal in the carrier.

In order that the invention may be clearly understood and readily carried into effect, the same will now be more fully described with reference to and by the aid of the accompanying drawings; wherein :—

Figure 1:
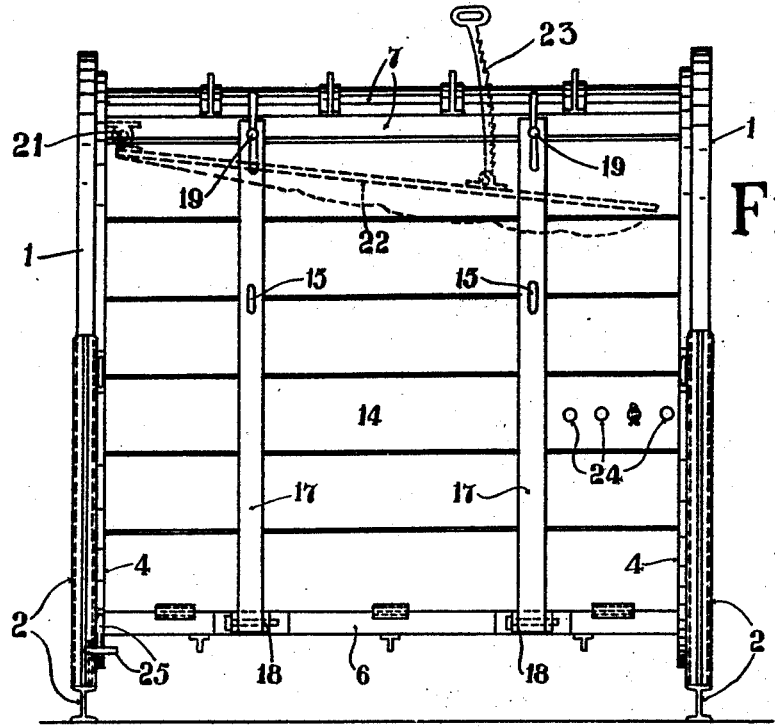
Figure 2:
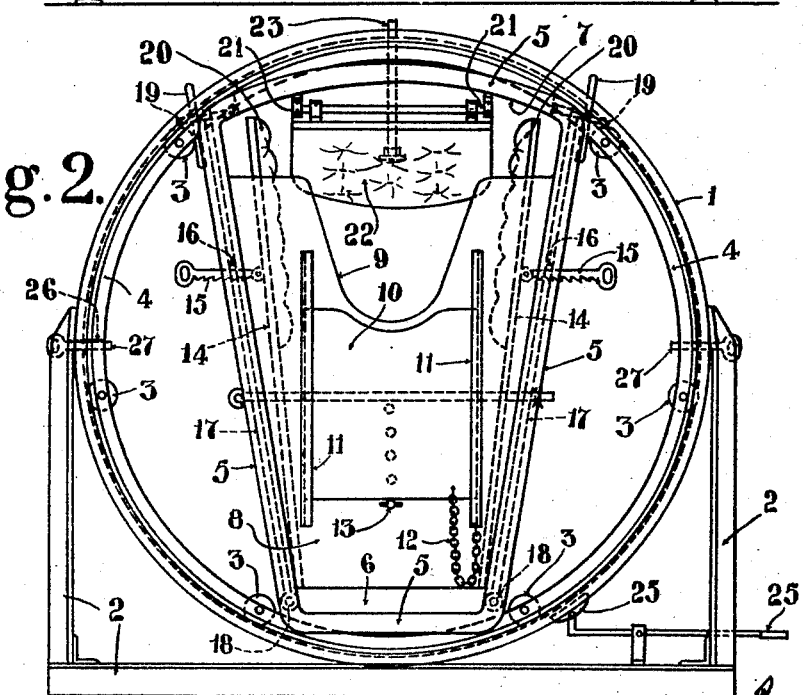

Figures 1 and 2 are respectively a side elevation and a front elevation of the machine or apparatus.

Referring to the drawings, the machine or apparatus comprises complete circular end tracks 1 of channel cross-section supported by end base frames 2, and runners or bowls 3 mounted in bearings on inner rings 4 engage within the circular channel tracks 1. The rings 4 each have associated therewith or secured thereto a carrier end frame 5 and the two frames 5 carry between them a floor 6 and a roof 7 while each end frame 5 has mounted within it an end wall 8. The front end wall 8 is cut away to afford an opening 9 for the animal's head and neck to pass through, while the said front end wall 8 is also provided with a sliding door 10 working within guides 11 and adapted to pass over or around the animal's neck behind the head. The movement of said sliding door 10 in one direction is adapted to be limited by a chain 12 secured to said door 10 and to the end wall 8, and a pin 13 adapted to be passed into any one of a series of holes in the front wall 8 of the carrier serves to limit the movement of the door 10 in the opposite direction. The side walls 14 of the carrier are hingedly connected to the floor 6 and are adapted to be moved inwardly by means of ratchet bars or racks 15 engaging holes 16 in members 17 also hinged at 18 to the floor 6 and adapted to be secured to the roof 7 by means of screw fastenings 19, and in this connection the upper portions of the inside faces of the side walls 14 are provided with pads 20 to prevent bruising the animal's sides when the side walls 14 are racked inwardly against them. The roof 7 has hinged thereto toward its forward end at 21 a padded top or board 22 adapted to be closed down on to the back of the animal within the carrier, said hinged top 22 being provided with a ratchet bar or rack 23 passing through a hole in the roof 7 for this purpose. In order to position a small or short animal forwardly of the carrier, a bar may be passed through any of a series of aligned holes 24 in the rear portion of the side walls 14.

Any appropriate means may be employed for rotating the carrier and in some cases appropriate gearing or mechanism may be applied whereby the carrier may be set in motion mechanically, electrically or otherwise as and when required.

A pivoted foot brake 25 adapted to be pressed into engagement with one of the inner rings 4 is provided for bringing the carrier to rest, and means may be provided for locking the carrier rings 4 to the stationary tracks 1 when the carrier is in the upright or the inverted position. Thus the stationary tracks 1 and the rings 4 may be provided with holes 26 which, when the carrier is in either the upright or the inverted position, are in alignment, and a pin or pins 27 may be passed through said holes 26 for locking purposes.

I claim :—

1. A machine or apparatus of the type specified, for use in supporting animals while being slaughtered comprising an arrangement of concentric rings, the outer one of which is stationary and the inner one of which supports the carrier to rotate within the outer ring, and the sides of the carrier are hinged to permit of their being swung open or closed against the sides of the animal, the top of the carrier being also adapted to be closed down on to the back of the animal in the carrier.

2. A machine or apparatus according to claim 1, wherein the stationary ring or rings constitute a complete circular track or tracks around which runners or bowls on the inner ring or rings associated with the carrier engage to facilitate rotating of the latter.

3. A machine or apparatus according to claim 1, wherein the hinged sides and top of the carrier have associated ratchet mechanism or racks for securing them in their adjusted positions.

HARRIS WEINBERG.